(12) United States Patent
Russell et al.

(10) Patent No.: US 11,420,869 B2
(45) Date of Patent: *Aug. 23, 2022

(54) PROCESS FOR REMOVING OXYGEN FROM A HYDROGEN STREAM

(71) Applicant: UOP LLC, Des Plaines, IL (US)

(72) Inventors: Bradley P. Russell, Wheaton, IL (US); David W. Greer, Cary, IL (US); Mark M. Davis, Highland Park, IL (US); Shain Doong, Kildeer, IL (US); Jince Sebastian, Gurgaon (IN)

(73) Assignee: UOP LLC, Des Plaines, IL (US)

( * ) Notice: Subject to any disclaimer, the term of this patent is extended or adjusted under 35 U.S.C. 154(b) by 301 days.

This patent is subject to a terminal disclaimer.

(21) Appl. No.: 16/751,459

(22) Filed: Jan. 24, 2020

(65) Prior Publication Data

US 2020/0270130 A1 Aug. 27, 2020

Related U.S. Application Data

(60) Provisional application No. 62/809,033, filed on Feb. 22, 2019.

(51) Int. Cl.
| | | |
|---|---|---|
| *B01D 53/00* | (2006.01) | |
| *C01B 3/50* | (2006.01) | |
| *B01D 53/047* | (2006.01) | |

(52) U.S. Cl.
CPC .............. *C01B 3/50* (2013.01); *B01D 53/047* (2013.01); *B01D 2253/102* (2013.01); *B01D 2253/104* (2013.01); *B01D 2253/112* (2013.01); *B01D 2257/104* (2013.01); *B01D 2257/702* (2013.01); *C01B 2203/042* (2013.01)

(58) Field of Classification Search
CPC ........ B01D 53/047; B01D 2255/20761; B01D 2257/104; B01D 2256/12; C01B 2203/043; C01B 3/56; C01B 13/0259; C01B 2203/042; C01B 2203/0465; C01B 2203/0495; C01B 21/0416; C01B 2203/0435; C01B 2203/047; C01B 3/50; C01B 3/58

See application file for complete search history.

(56) References Cited

U.S. PATENT DOCUMENTS

| | | | | |
|---|---|---|---|---|
| 5,169,413 A | * | 12/1992 | Leavitt ............... | B01D 53/0462 |
| | | | | 95/96 |
| 2014/0308176 A1 | * | 10/2014 | Golden ............... | C01B 21/0416 |
| | | | | 422/187 |

* cited by examiner

*Primary Examiner* — Sharon Pregler
(74) *Attorney, Agent, or Firm* — Paschall & Associates, LLC; Mark Goldberg

(57) ABSTRACT

A pressure swing adsorption process is provided to remove oxygen from a hydrogen stream through the use of a copper material in combination with layers of adsorbent to remove water, C2 and C3 hydrocarbons, as well as other impurities. The feed gas comprises more than 70 mol % hydrogen, at least 1 mol % methane and more than 10 ppmv oxygen. The purified product hydrogen stream comprises greater than 99 mol % hydrogen, with less than 1 ppmv oxygen.

20 Claims, No Drawings

PROCESS FOR REMOVING OXYGEN FROM A HYDROGEN STREAM

This application claims priority from provisional application 62/809,033 filed on Feb. 22, 2019.

BACKGROUND OF THE INVENTION

The invention relates to a process for removing oxygen from a hydrogen stream. More specifically, the invention relates to the use of a catalyst in a pressure swing adsorption unit to remove oxygen.

Oxygen removal is difficult in pressure swing adsorption (PSA) hydrogen units due to the low oxygen capacity of conventional adsorbents (including activated carbon, molecular sieve zeolites, activated alumina, and silica gel). In situations where oxygen removal is required, PSA bed volume increases substantially and hydrogen recovery drops by several percentage points. For example, in propane dehydrogenation units (such as UOP's Oleflex™ process), a small amount of air ingress is possible due to low-pressure (vacuum) operation, leading to the presence of oxygen (50 to 100 ppmv) in net gas feed to PSA unit. In cases where the PSA hydrogen product is exported, a typical oxygen pipeline specification is <1 ppmv. However, in prior art processes oxygen removal causes a large drop in PSA hydrogen recovery. A similar issue is found in other situations that require similar oxygen removal requirements (e.g., refinery off-gas and coke oven gas) and these processes also suffer from low PSA hydrogen recovery and large PSA bed volume due to low oxygen capacity of conventional adsorbents. Accordingly, an improved oxygen adsorbent or catalyst is needed for PSA applications that require oxygen removal. It has now been found that an activated alumina catalyst comprising copper is particularly effective in removing oxygen without impacting the recovery of hydrogen.

SUMMARY OF THE INVENTION

A copper material has been found to remove oxygen with a very high working capacity in a pressure swing adsorption cycle, resulting in much improved PSA performance and cost. This copper material may be used as a thin layer near the feed end of a pressure swing adsorption bed. The other layers that may be used include an upstream activated carbon layer that removes C3/C2 hydrocarbons including ethylene and propylene and other trace impurities thus protecting the copper material from potential harmful contaminants (H2S, olefins, etc.). Another activated carbon layer may be used downstream of the copper material layer to remove methane plus trace water and carbon dioxide that may be generated in the copper material layer by reduction of copper oxides and by hydrogen and carbon monoxide oxidation (thereby protecting downstream molecular sieves from water and carbon dioxide). Based on experimental results to date, it is believed that the copper material functions by an oxidation/reduction mechanism i.e., oxygen is chemisorbed during the high-pressure feed step in the PSA cycle, and then copper is reduced (thereby forming water and carbon dioxide) during the regeneration/purge step. Using this bed configuration allows one to maintain high hydrogen recovery and small PSA bed volume.

DETAILED DESCRIPTION OF THE INVENTION

It has been found that in some instances, due to the ingress of air into a net gas stream, there is the introduction of an excessive amount of oxygen into the net gas which is to be processed to produce a high purity hydrogen stream.

In an example, the feed gas had the composition shown in Table 1.

TABLE 1

|  | Mol % |
|---|---|
| Hydrogen | 95.50 |
| Oxygen | 65 ppmv |
| Nitrogen | 0.03 |
| Carbon Monoxide | 0.08 |
| Methane | 3.95 |
| Ethane | 0.14 |
| Ethylene | 0.02 |
| Propane | 0.02 |
| Propylene | 0.03 |
| Water | 0.23 |
| Hydrogen Sulfide | trace |

In a typical adsorbent bed, a layer of activated alumina, followed by a larger layer of activated carbon and then a layer of 5A zeolite are used to produce a 99.9 mol % hydrogen stream with less than 1 ppmv oxygen and less than 1 ppmv carbon monoxide. However, standard adsorbents have a low capacity for removing oxygen in such processes. As a result, removing oxygen to a typical pipeline specification of less than 1 ppmv from the feed gas in TABLE 1 using a pressure swing adsorption unit results in a hydrogen recovery drop of about 20 percentage points (e.g., hydrogen recovery decreases from 90% to about 70%) and a bed volume increase of three times.

It has now been found that adding an additional layer of catalyst within the PSA bed, preferably the copper material used in the present invention, is successful in removing oxygen from a feed stream without a decrease in hydrogen recovery. For example, the feed gas in TABLE 1 can be purified in a PSA unit comprising a layer of copper material with a hydrogen product purity of 99.9 mol % and oxygen less than 1 ppmv with 90% hydrogen recovery. In a preferred embodiment of the invention, the feed passes first through a layer of activated alumina, silica gel, or activated carbon to remove water, C2 and C3 hydrocarbons (including ethylene and propylene), and other impurities (such as hydrogen sulfide). Then the feed passes through a layer of copper material to remove oxygen, followed by a layer of adsorbent to remove methane and trace water and carbon dioxide generated by the copper material layer. Finally, a layer of a molecular sieve, such as a 5A zeolite is used to remove methane, carbon monoxide and nitrogen. The copper material is able to remove 300 times as much oxygen as compared to the activated carbon adsorbent used in the prior art. The copper material is typically loaded in oxidized form (e.g. CuO), and is subsequently reduced to copper metal during normal PSA operation in a reducing (hydrogen) environment. There is a high degree of macro-porosity in the activated alumina support for rapid adsorption and short mass transfer zone. Typically, the copper material has a bulk density of about 800 kg/m3.

Any of the above lines, conduits, units, devices, vessels, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, process or status measurements, and data from monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

SPECIFIC EMBODIMENTS

While the following is described in conjunction with specific embodiments, it will be understood that this description is intended to illustrate and not limit the scope of the preceding description and the appended claims.

A first embodiment of the invention is a process for producing a high-purity hydrogen gas stream from a feed stream comprising hydrogen, hydrocarbons, and oxygen, the process comprising sending the feed gas through an adsorbent bed comprising a copper material at a pressure greater than about 4 bar(g) and a temperature less than about 60° C. to remove the oxygen from the feed stream, and then purging the adsorbent bed in a counter-current direction with a hydrogen-rich gas at a pressure less than about 1 bar(g) and a temperature less than about 60° C. An embodiment of the invention is one, any or all of prior embodiments in this paragraph up through the first embodiment in this paragraph, wherein the feed stream comprises more than 70 mol % hydrogen. An embodiment of the invention is one, any or all of prior embodiments in this paragraph up through the first embodiment in this paragraph, wherein the feed stream comprises more than 1 mol % methane. An embodiment of the invention is one, any or all of prior embodiments in this paragraph up through the first embodiment in this paragraph, wherein the feed stream comprises more than about 10 ppmv oxygen. An embodiment of the invention is one, any or all of prior embodiments in this paragraph up through the first embodiment in this paragraph, wherein the feed stream comprises C2 and C3 hydrocarbons. An embodiment of the invention is one, any or all of prior embodiments in this paragraph up through the first embodiment in this paragraph, wherein the feed stream comprises more than about 200 ppmv nitrogen. An embodiment of the invention is one, any or all of prior embodiments in this paragraph up through the first embodiment in this paragraph, wherein the feed stream comprises more than about 400 ppmv carbon monoxide. An embodiment of the invention is one, any or all of prior embodiments in this paragraph up through the first embodiment in this paragraph, wherein the feed stream is passed through the adsorbent bed at a pressure greater than about 15 bar (g) and a temperature less than about 50° C. An embodiment of the invention is one, any or all of prior embodiments in this paragraph up through the first embodiment in this paragraph, wherein a hydrogen product stream is produced having a purity of over 99 mol % hydrogen and less than about 5 ppmv oxygen, preferably less than about 1 ppmv oxygen. An embodiment of the invention is one, any or all of prior embodiments in this paragraph up through the first embodiment in this paragraph, wherein the copper material comprises greater than about 10 wt. % copper on an activated alumina support. An embodiment of the invention is one, any or all of prior embodiments in this paragraph up through the first embodiment in this paragraph, wherein an upstream layer of adsorbent removes C2 and C3 impurities including ethylene and propylene. An embodiment of the invention is one, any or all of prior embodiments in this paragraph up through the first embodiment in this paragraph, wherein the upstream layer of adsorbent comprises activated carbon. An embodiment of the invention is one, any or all of prior embodiments in this paragraph up through the first embodiment in this paragraph, wherein a downstream layer of adsorbent from the copper material removes water and carbon dioxide generated in the copper material layer by reduction of copper oxides and by hydrogen oxidation and carbon monoxide oxidation reactions. An embodiment of the invention is one, any or all of prior embodiments in this paragraph up through the first embodiment in this paragraph, wherein the downstream layer of adsorbent comprises activated carbon. An embodiment of the invention is one, any or all of prior embodiments in this paragraph up through the first embodiment in this paragraph, wherein the oxygen is chemisorbed upon contacting the copper material in the higher pressure feed step and then reduced with production of water and carbon dioxide during a the lower pressure regeneration and purge step. An embodiment of the invention is one, any or all of prior embodiments in this paragraph up through the first embodiment in this paragraph, wherein the purge step comprises sending a hydrogen-rich stream comprising 90 mol % or more hydrogen through the copper material bed. An embodiment of the invention is one, any or all of prior embodiments in this paragraph up through the first embodiment in this paragraph, wherein the purge step is at a counter-current direction at a pressure less than about 1 bar (g) and a temperature less than about 60° C. An embodiment of the invention is one, any or all of prior embodiments in this paragraph up through the first embodiment in this paragraph, wherein the copper material layer comprises about 5 to about 20 volume % of the adsorbent bed. An embodiment of the invention is one, any or all of prior embodiments in this paragraph up through the first embodiment in this paragraph, wherein the upstream layer comprises about 5 to about 30 volume % of the adsorbent bed. An embodiment of the invention is one, any or all of prior embodiments in this paragraph up through the first embodiment in this paragraph, wherein the downstream layer comprises about 5 to about 30 volume % of the adsorbent bed.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for producing a high-purity hydrogen gas stream from a feed stream comprising hydrogen, hydrocarbons, and oxygen, said process comprising sending said feed stream through an adsorbent bed comprising a copper material at a pressure greater than about 4 bar(g) to remove said oxygen from said feed stream, and then purging said adsorbent bed in a counter-current direction with a hydrogen-rich gas at a pressure less than about 1 bar(g).

2. The process of claim 1 wherein said feed stream is passed through said adsorbent bed at a temperature less than about 60° C.

3. The process of claim 1 wherein said during purging of said adsorbent bed said hydrogen-rich gas has a temperature of less than about 60° C.

4. The process of claim 1, wherein said feed stream comprises more than 70 mol % hydrogen.

5. The process of claim 1, wherein said feed stream comprises more than 1 mol % methane.

6. The process of claim 1, wherein said feed stream comprises more than about 10 ppmv oxygen.

7. The process of claim 1, wherein the feed stream comprises C2 and C3 hydrocarbons.

8. The process of claim 1, wherein the feed stream comprises more than about 200 ppmv nitrogen or more than about 400 ppmv carbon monoxide.

9. The process of claim 1, wherein said feed stream is passed through said adsorbent bed at a pressure greater than about 15 bar (g) and a temperature less than about 50° C.

10. The process of claim 1, wherein a hydrogen product stream is produced having a purity of over 99 mol % hydrogen and less than about 5 ppmv oxygen, preferably less than about 1 ppmv oxygen.

11. The process of claim 1, wherein said copper material comprises greater than about 10 wt. % copper on an activated alumina support.

12. The process of claim 1, wherein an upstream layer of adsorbent removes C2 and C3 impurities including ethylene and propylene.

13. The process of claim 12, wherein said upstream layer of adsorbent comprises activated carbon.

14. The process of claim 1, wherein a downstream layer of adsorbent from said copper material removes water and carbon dioxide generated in the copper material layer by reduction of copper oxides and by hydrogen oxidation and carbon monoxide oxidation reactions.

15. The process of claim 1, wherein said oxygen is chemisorbed upon contacting said copper material in said higher pressure feed step and then reduced with production of water and carbon dioxide during a said lower pressure regeneration and purge step.

16. The process of claim 1, wherein said purge step comprises sending a hydrogen-rich stream comprising 90 mol % or more hydrogen through said copper material bed.

17. The process of claim 1, wherein said copper material layer comprises about 5 to about 20 volume % of said adsorbent bed.

18. The process of claim 12, wherein said upstream layer comprises about 5 to about 30 volume % of said adsorbent bed.

19. The process of claim 14, wherein said downstream layer comprises about 5 to about 30 volume % of said adsorbent bed.

20. The process of claim 1, further comprising at least one of: sensing at least one parameter of the process and generating a signal or data from the sensing; generating and transmitting a signal; or generating and transmitting data.

* * * * *